United States Patent [19]

Nunn

[11] Patent Number: 5,625,257
[45] Date of Patent: Apr. 29, 1997

[54] EMERGENCY VEHICLE LIGHT SWITCHING AND CONTROLLING CIRCUIT

[75] Inventor: Ewing D. Nunn, Yorba Linda, Calif.

[73] Assignee: Dunbar-Nunn Corporation, Anaheim, Calif.

[21] Appl. No.: 514,301

[22] Filed: Aug. 11, 1995

[51] Int. Cl.$^6$ .................................................. B60Q 1/26
[52] U.S. Cl. .......................... 315/77; 315/80; 307/10.8; 340/456
[58] Field of Search .............................. 340/456, 457.2, 340/457.3, 457; 307/9.1, 10.1, 10.7, 10.8; 315/80, 81, 82, 200 A, 77

[56] References Cited

U.S. PATENT DOCUMENTS

| | | | |
|---|---|---|---|
| 4,831,357 | 5/1989 | Miller | 340/472 |
| 5,140,304 | 8/1992 | Miller | 340/472 |
| 5,473,306 | 12/1995 | Adell | 340/468 |

*Primary Examiner*—Robert Pascal
*Assistant Examiner*—David H. Vu
*Attorney, Agent, or Firm*—George F. Bethel; Patience K. Bethel

[57] ABSTRACT

An emergency vehicle lighting system is disclosed having one or more emergency vehicle lights with a switch operable by movement of the emergency vehicle transmission shifter. An electronic circuit for disconnecting power to the emergency lights is provided when the emergency vehicle shifter is shifted into a park or neutral position. The circuit can comprise discrete components including a flip flop or a micro-processor circuit connected to the shifter switch to provide power to the emergency lights, and which has been programmed to cut off the lights when the switch indicates that the shifter has been placed in a park or neutral position.

15 Claims, 2 Drawing Sheets

EMERGENCY VEHICLE LIGHT SWITCHING AND CONTROLLING CIRCUIT

BACKGROUND OF THE INVENTION

1. Field of the Invention

This invention relates to emergency vehicle lights. It specifically relates to such lights which are operated by actuating a circuit which can provide certain lighting functions including flashing lights on a light bar and other emergency lights. Accompanying the lighting circuit is a control circuit and panel generally mounted within the emergency vehicle for selecting certain lights and placing the lighting in various operational modes.

2. Prior Art

The prior art with regard to electronic circuits for emergency vehicle lighting incorporates such lights as those that were originally only of a single output. As sophisticated lighting requirements developed, lights were created that provided not only a flashing appearance but also strobe and variegated outputs. These respective lights are known and appreciated by emergency vehicle operators and have been substantially met with acceptance by the general public as a warning of an approaching emergency vehicle.

The general structure of emergency vehicle lights comprise a power circuit, a switch panel and/or a control circuit mounted within the emergency vehicle. The switch panel and/or control circuit mounted in the emergency vehicle oftentimes was placed under or on the dashboard of an emergency vehicle. The output of the control circuit which provided the various lights was received in connection with a lighting power circuit which in turn was connected to the lights for providing the lighting functions.

Oftentimes, it was desirous to have a light of a particular nature such as a blinking, strobe or elongated flash emanate from the light output. All of these lighting controls could be handled by selector switches mounted on the control panel. The selector switches have developed over the years with various circuitry functions to provide various lighting outputs and control functions.

This invention is directed toward allowing the lights to be lit until the vehicle is stopped and the transmission is placed in park or neutral. At this point, the lights cease while the officer or driver of the emergency vehicle attends to business with a particular party whom he has apprised by the warning lights.

Upon re-entering the vehicle, the officer or individual driving the emergency vehicle can put the vehicle from neutral or park into a mode for driving at which time the lights go on again. This has caused surprise at the least and extreme annoyance and impromptu responses from the driver of the emergency vehicle or the party being warned such that an accident or other discomfiture could take place.

This particular invention allows for an elimination of the problem of emergency lights being re-lit when the emergency vehicle is placed in a drive mode from the neutral or park mode. This is due to the inventive circuitry not reactivating the lights. The overall development of this particular light cut off or disabling function upon positioning of the shift lever into drive or park enhances emergency vehicle activity as well as the related siren functions as will be seen hereinafter.

The invention further allows the lights to continue functioning after the vehicle has been parked or the shift lever placed in neutral. This optional feature permits continued warning to those surrounding or joining the emergency vehicle such as on a busy thoroughfare or highway. This is accomplished by a unique momentary reset response.

The invention allows a micro-processor to control both the light abatement functions, control of the lights and attendant control and provision of a siren all in one micro-processor. This eliminates complex circuitry and creates a dual capacity light controller and siren controller with appropriate cut off functions.

SUMMARY OF THE INVENTION

Summarily stated this invention comprises an emergency vehicle lighting system which can be deactivated or disabled when placing the vehicle's shift lever into a park or neutral position and which will not be reactivated upon placing the shift lever into a drive or driving mode. It has the optional feature of being able to be activated when the vehicle is in the park or neutral position in order to provide a warning.

More specifically, the invention comprises a lighting selector switch with a number of circuit logic components that allow for switching and abating emergency vehicle lighting functions. A logic and memory circuit, or a micro computer is provided that can be in the form of an integrated circuit having computerized functions. It is connected to the emergency lighting system for control through a series of components such as "AND," and "OR" gates. This can provide for an output dependent upon the position of the lighting selector switch and the placement of the park and neutral switch of the drive system of the emergency vehicle.

The park and neutral switch of the drive system of the emergency vehicle is in turn connected to the integrated circuit in a manner to latch or create a function for cutting off the output of the lighting system. This takes place when the lighting switch is in a particular functional position mode that causes the lights to function. The disabling of the lights by the integrated circuit receiving the output of the park/neutral switch provides for cutting off of the emergency lights.

The foregoing circuit functions can also be provided in great measure by a microprocessor circuit.

After the park/neutral switch is opened, the integrated circuit or micro-processor further provides for automatically returning the emergency lights to a normal operation. Also the optional feature of overriding the cutting off function can take place by the light reset function as described hereinafter.

DESCRIPTION OF THE PREFERRED EMBODIMENTS

As previously stated, when an emergency vehicle is in pursuit or trying to warn people of its presence or of the fact that it is moving through traffic, it often turns on its emergency vehicle lights. For instance, police vehicles as well as fire engines, ambulances, and other emergency vehicles often have various lighting systems.

When a police officer exits his vehicle after a pursuit, he does not want to be burdened with turning off the lighting system. In many cases, when the police officer comes to a stop and shifts the vehicle into park or neutral, the light should stop. However, in some cases there are occasions where the emergency vehicle lights need to stay on while the vehicle is in park or neutral.

For instance, envision the situation wherein an emergency vehicle such as a police vehicle has stopped to either direct traffic, stop a driver, or provide for other service. At such time, in order to provide for warning even after stopping, the vehicle sometimes has its lights maintained in the on position.

As a consequence, this invention is such wherein when the vehicle is shifted into park or neutral, the lights will automatically shut off. However, a convenient method and switching system is provide for canceling the light cutting off system and returning the light system to a status that existed immediately prior to shifting into park or neutral.

Figure 1:
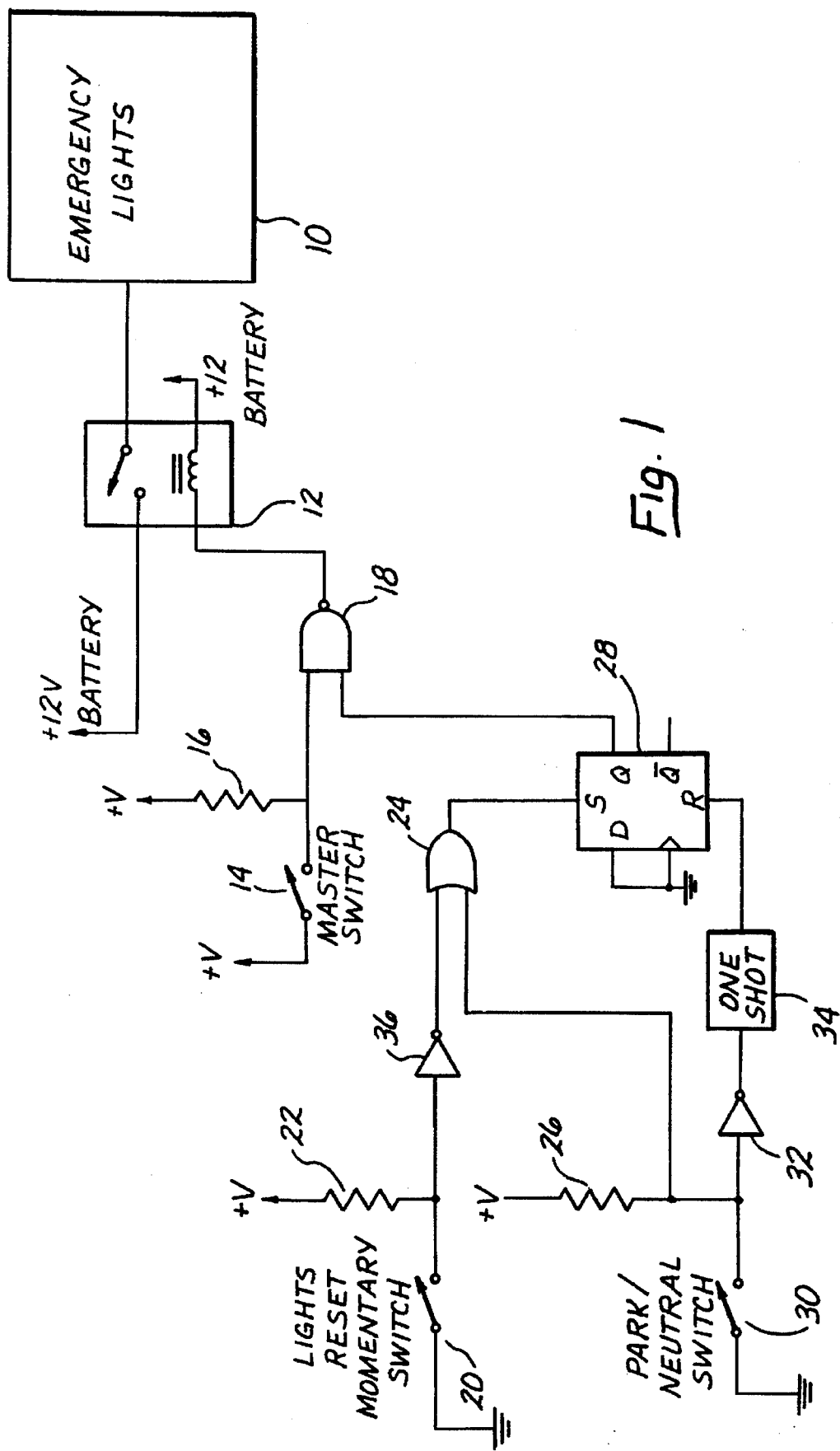
FIG. 1 shows the light cutting off system of this invention in a schematic form.

Now looking more particularly at FIG. 1, it can be seen that there is an implementation of the invention with discrete components which can also be substituted with an integrated circuit. The components are well known logic elements 18, 24, 28, 32, 34, and 36. A park neutral switch 30 is shown interconnected by the components to a power relay 12, a momentary switch 20 and to a lighting system or emergency vehicle lights.

When looking at the system in greater detail, it can be seen that lights 10 have been shown. The lights 10 can be in the form of a light bar such as those on police officer's vehicles that have strobe lights or alternative lights on either side that blink, flash, or can be lit in various modes to create a specifically desired warning function. This can also be enhanced by other lighting functions which can be outside of the light bar area such as a central red flashing light or an emergency swivel light.

The light bar can include various lights as previously stated. In order to control the light bar, or other lights of an emergency vehicle by providing a battery power, a power relay 12 is used to control the lights in response to a master switch 14.

Such master switches 14 which are known in the art are oftentimes mounted on the dashboard of an emergency vehicle within a console. These switches can be in the form of toggle switches, slide switches, momentary switches, rotary switches, or other types of switches such as digital touch switches. Regardless, the unit with the controls is usually mounted under the dash or on the dash of an existing vehicle. They can also incorporate a siren function as will be detailed hereinafter in conjunction with the lighting switches and console. Thus, the master switch 14 opens and closes and causes the emergency lights 10 to be controlled in an on/off mode or any other mode as desired.

In order to power the system, a 12 volt battery is usually utilized. The 12 volt battery is such wherein it services the system including the emergency lights 10 by being interconnected through the power relay 12. The power relay 12 allows the system to function with the electronic components as previously referred to or in the alternative a microprocessor as will be detailed hereinafter.

It should be noted that the system operates at plus 12 volts through the battery to ground. The vehicle ground is usually considered to be preferable rather than a negative and positive polarity having to be accommodated. In effect, with a ground in the vehicle on the negative side of the battery, an overall enhancement and ease of operation and connection can be effectuated for all components, and the invention hereof even though inverters are required as seen hereinafter.

The foregoing components will be detailed hereinafter with regard to not only the aspects thereof, but also the function. In doing this, it should be noted that the power relay 12 and therefor the power from the battery to the lights is controlled by inverting AND gate 18. When the output of the inverted AND gate 18 is low, 12 volts are applied across the coil of the power relay 12. This causes a closing of the relay to apply the power to the lights 10 which comprises the emergency vehicle lights which can be a light bar, or discrete lights, or other combinations.

Looking more particularly at the circuit, it can be seen that a flip flop 28 is shown. The flip flop 28 has its respective outputs that are normal to a flip flop. The closing of the power relay 12 occurs when the output of master switch 14 is high and the D output of the flip flop 28 is also high. This enables the inverting AND gate 18 to provide the signal to the power relay 12 to turn on the lights 10.

A one shot 34 is provided which is connected to inverter 32 which is in turn connected to the park/neutral switch 30. The park/neutral switch 30 is provided in an emergency vehicle so that it is in the open position when the vehicle is moving. When the vehicle is parked or in neutral the switch 30 is then closed. However, it should be understood that other circuitry other than a park/neutral switch 30 can be utilized in order to provide a signal as to when the vehicle is in either park or neutral. Also, the respective polarities can be switched so that the park/neutral switch is closed when the vehicle is being driven and open when the vehicle is not being driven.

When looking at the park/neutral switch 30 and the inverter 32 with the one shot 34, it can be seen that an output is generated upon closing of the park/neutral switch. In effect, the one shot 34 effectuates the following. A positive going voltage transition at its input causes a short positive pulse at its output. At all other times regardless of its input voltage its output is low.

More specifically, when the vehicle is in gear, the status is as follows. The park/neutral switch 30 is open at this point. The pull-up resistor 26 applies at this point a positive voltage to the lower input of OR gate 24. This causes a positive input to be applied to the S input of flip flop 28. A positive level on the S input of the flip flop 28 causes a high level at the Q output. This level is applied to the lower input of inverting AND gate 18. If the master switch 14 is also closed, then both inputs to the inverting AND gate 18 are high and therefor it's output is low thereby applying power to the lights 10.

Now looking at the function of the system when the vehicle is being stopped, the following takes place. Upon stopping the vehicle and shifting into park or neutral this causes the park/neutral switch 30 to close. At this point, the lower input to OR gate 24 goes low. The momentary switch 20 is open and pull-up resistor 22 holds the input to inverter 36 high causing the upper input of OR gate 24 to be low.

Since both inputs to the OR gate 24 are low, the S input to the flip flop 28 is low. This does not change the output of the flip flop 24 but permits a change if a pulse is applied to the R input of the flip flop 28.

The transition from a high state to a low state caused by the closure of the park/neutral switch 30 is also applied to the inverter 32. A positive going transition occurs at the output of the inverter 32 which causes a positive pulse to be generated by the one shot 34. This positive pulse from the one shot 34 is connected to the R input of the flip flop 28; This causes the flip flop 28 to go to the reset state. At this point, the Q output of the flip flop 28 goes low. This causes the output of the inverting AND gate 18 to go high and the power relay 12 to open. This disconnects the power to the lights 10. Thus, at this point, the lights as turned on through the master switch 14 are now turned off.

Now looking at the flip flop, it is seen that both the R and S inputs of the flip flop 28 are low. The emergency vehicle lights 10 will remain off until the S input goes high. As previously stated, it is sometimes desirable once the lights have been turned off to return them to a lit condition in order for the police officer to direct traffic or allow a warning to oncoming vehicles overtaking a particular vehicle that is stopped or in other such emergency vehicle situations. Thus, it is desirable oftentimes to turn the light 10 back on.

In order to turn the lights 10 back on with the vehicle in park or neutral (i.e. the park/neutral switch) being closed, the operator presses the momentary lights reset switch 20. The momentary lights reset switch 20 when closed causes the input of the inverter 36 to go low. The upper input of OR gate 24 then goes high and the Q output of the flip flop 28 goes high. The output of the inverting AND gate 18 then goes low and power relay 12 closes the relay switch causing power to go from the battery to the emergency lights 10.

When the momentary lights reset switch 20 was pressed the light abatement feature of the invention was deactivated. At this point, the lighting system in its entirety only responds to the master switch 14 again turning the lights to any particular position which is desired. This could be all the lights, a series of lights, or only one particular light depending upon where the master switch 14 is turned to. As previously stated, the master switch 14 can be in the form of a rotary switch or other types of switches for selecting various lighting functions.

After the light cutting off feature has been deactivated, placing the vehicle in gear has no further effect. When the vehicle is placed in gear, the park/neutral switch 30 opens, the lower input of OR gate 24 goes high, causing the S input and consequently the Q output of flip flop 28 to go high. However, since the Q output of flip flop 28 had already been set high when the lights reset switch 20 was pressed, no change occurs.

Figure 2:
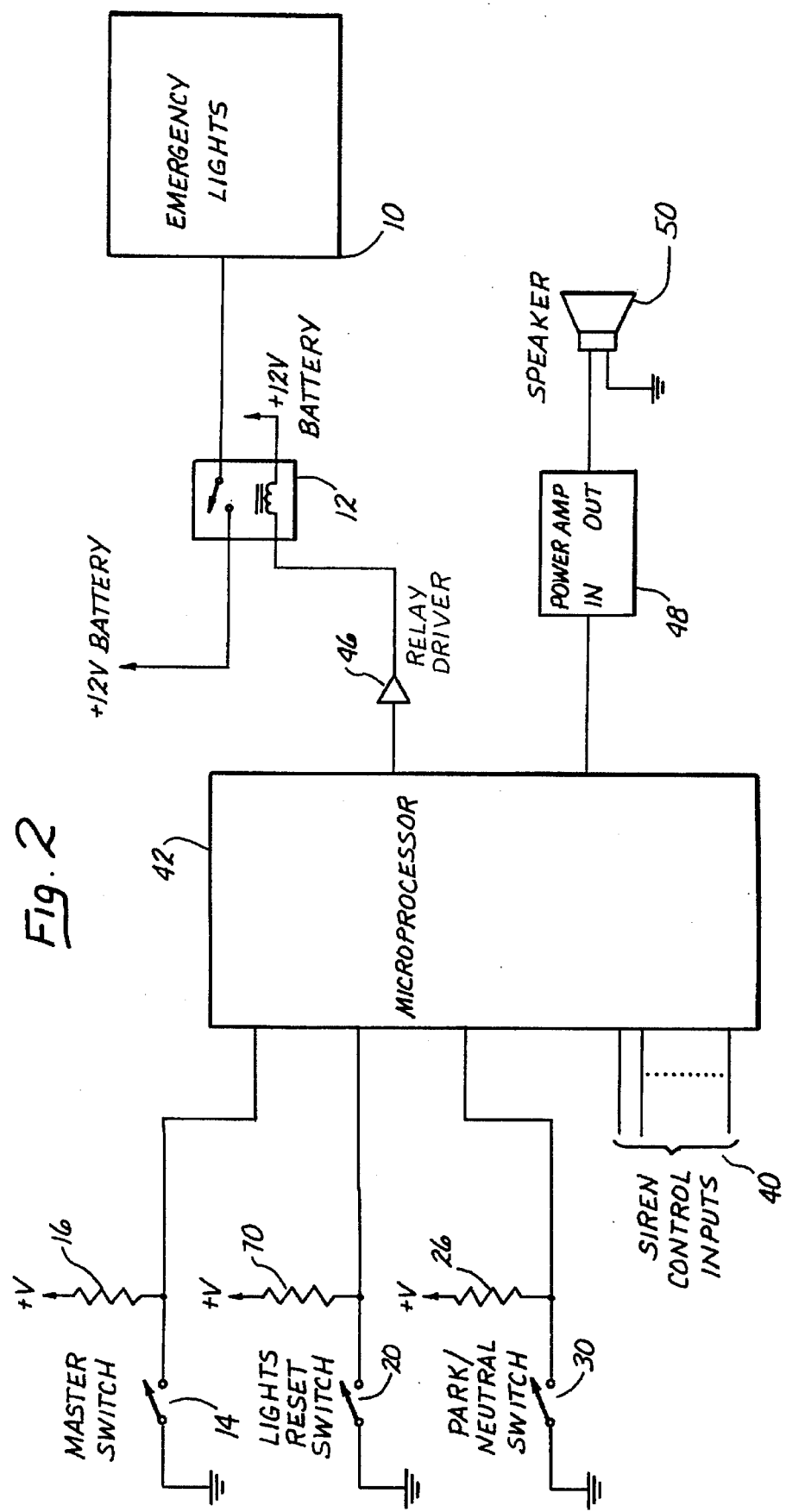
FIG. 2 shows the light cutting off system of this invention in a schematic form wherein a micro-processor is used in great measure in substituted relationship for the components in FIG. 1.

Looking more particularly now at FIG. 2, it can be seen that a micro-processor 42 is shown. This in effect is a preferred implementation because of the ease and ability of the micro-processor 42 to assume a number of functions.

When looking in detail at FIG. 2, it can be seen that a micro-processor 42 is shown. This micro-processor 42 supplies the logic and memory functions performed by the gates, inverters and flip flop 28 detailed in FIG. 1.

The micro-processor 42 can be dedicated to the emergency light system and lights 10 or it can be shared by other systems. As shown in FIG. 2, the micro-processor 42 is used for the siren system as well as the emergency light system. When in this mode, the siren system comprises switch inputs 40. The switch inputs 40 can be in the form of a series of selected siren sounds that are controlled by a switch on the same console or an associated console with that of the master switch 14 for the lights.

The siren control inputs 40 and switch positions can provide the well known hi-lo yelp or wail tones. These can be switched into the micro-processor 42 which can then be programmed to provide the various tones at its output to a power amplifier 48 which is connected to a speaker 50 for emanating the emergency vehicle siren tones. Also, various outputs and control functions for various siren sounds can be implemented at the siren control inputs 40. Thus, the micro-processor 42 can be used for the siren functions of an emergency vehicle as well as the emergency vehicle lights 10 as detailed hereinafter. As a further explanation of this siren feature, please note U.S. patent application Ser. No. 08/409,205 by the inventor hereof filed Mar. 23, 1995.

With respect to the emergency vehicle lighting system, the master switch 14 is connected to a pull-up resistor 16. This in turn is connected to the micro-processor 42. This allows the micro-processor 42 to function and turn on the emergency lights 10 with the same functional elements as referred to hereinbefore.

By cycling the park/neutral switch 30 connected to its pull-up resistor 26 from the open to closed position it turns off the emergency vehicle lights 10. When pressing the light reset switch 20, it negates the action of the cycling of the park/neutral switch 30 until it is cycled again.

In order to provide this, the micro-processor 42 is programmed so as to allow the master switch 14 to function in the same manner as previously stated in FIG. 1. Also, the light reset switch 20 is such wherein it provides the same functions as the light reset switch 20 in FIG. 1 while the park/neutral switch 30 provides the light cutting off function, and can also turn off the siren when it is in park or neutral. To understand this further please review the prior noted patent application.

In order to accommodate the functions of the emergency vehicle lighting system and circuitry, a pull-up resistor 70 is utilized in connected relationship to the light reset switch 20. Also, since the output current of the micro-processor 42 is very limited, a relay driver 46 connects the micro-processor to the power relay 12 to implement a proper relay function.

As a consequence of the foregoing invention, it can be seen that a lighting system for emergency vehicle lights 10 can be deactivated automatically through the placing of the vehicle into a park or neutral state. It can then be activated by merely pressing the light reset switch 20 if so desired. Consequently, the emergency vehicle operator need not concern himself about turning the lights off when parking the vehicle or if its so desired, the operator can have a respective function turned back through the light reset switch 20 which is controlled by the master switch 14 as to the particular lights that are to be operated. Consequently, various modes of operation can be effectuated by the light reset function as well as the emergency vehicle lights 10 for various outputs.

Also, as can be appreciated, the implementation of the micro-processor circuit as shown in FIG. 2 allows for a micro-processor such as micro-processor 42 to provide both siren and lighting functions in one micro-processor. As a consequence, the foregoing invention should be read broadly in light of the following claims with regard to light cutting off and combination aspects of the emergency vehicle light abatement system as described hereinbefore.

I claim:

1. An emergency vehicle lighting system wherein emergency lights are controlled for an emergency vehicle comprising:

one or more emergency vehicle lights;

a source of power connected to said one or more emergency vehicle lights;

switch means in association with said emergency vehicle which is operable by movement of said emergency vehicle transmission shifter;

electronic circuit means for disconnecting power to an one or more emergency lights when said emergency vehicle shifter is shifted into a park or neutral position;

a master switch means connected to said emergency vehicle lights for selectively lighting said emergency vehicle lights; and, resetting means connected to said electronic circuit means for resetting said emergency vehicle lights when said emergency vehicle transmission shifter is in the park or the neutral position.

2. The system as claimed in claim 1 wherein:

said resetting means comprises a momentary switch.

3. The system as claimed in claim 2 further comprising:

flip flop means connected to said park/neutral shifter switch and to said emergency lights;

relay means connected to said flip flop means responsive to the position of said flip flop means and said park/neutral shifter switch.

4. The system as claimed in claim 3 wherein:

said momentary switch connected to said flip flop for changing the state of said flip flop when said park/neutral shifter switch is in a position for disabling said emergency vehicle lights.

5. The system as claimed in claim 4 further comprising:

inverter means within said electronics in order to provide for the polarity of the source of power with respect to vehicle ground.

6. An emergency vehicle lighting control system for controlling the vehicle's emergency lights comprising:

means for connecting a source of power to said lights;

switch means connected to a shifter of an emergency vehicle responsive to when said shifter is placed in a park or neutral position;

a micro-processor circuit connected to said emergency vehicle shifter switch means and to said means for connecting a source of power to said lights which has been programmed to cut off said lights when said emergency vehicle switch means responds to when the shifter has been placed in a park or neutral position;

a master switch having connections to provide variable switch positions corresponding to various light outputs by said emergency vehicle lights, connected to said micro-processor; and, a light reset switch connected to said micro-processor for causing said lights to light after said shifter has been placed in a park or neutral position.

7. The system as claimed in claim 6 wherein said means for connecting a source of power comprise:

a relay.

8. The system as claimed in claim 7 further comprising:

inverter means for accommodating the polarity of the electronics and the micro-processor when connected to vehicle ground.

9. The combination of an emergency vehicle lighting system and a siren for said emergency vehicle comprising:

one or more emergency vehicle lights;

a shifter switch connected to a shifter of an emergency vehicle responsive to the shifter being in a park or neutral position;

a micro-processor connected to said shifter switch;

a siren control input means connected to said micro-processor for selecting various siren sounds;

means connected to said micro-processor for emanating one of said selected siren sounds; and, means connected to said micro-processor for cutting off power to said one or more emergency vehicle lights when said shifter is switched into a park or neutral position.

10. The system as claimed in claim 9 further comprising:

a master switch connected to said micro-processor for selecting the lights.

11. The system as claimed in claim 10 wherein:

said micro-processor is programmed to cut off the siren sounds when said shifter is placed into a park or neutral position.

12. The system as claimed in claim 11 further comprising:

a switch connected to said micro-processor with reset means for resetting said micro-processor output connected to said emergency lights when said shifter is in the park or neutral position to light said emergency lights in a lit mode.

13. The system as claimed in claim 12 further comprising:

a power amplifier connected to said micro-processor for amplifying siren sounds.

14. The system as claimed in claim 13 further comprising:

relay means connected to a source of battery power to provide power to at least one or more emergency lights.

15. The system as claimed in claim 14 further comprising:

means connected to said micro-processor and to said siren control input means for causing said micro-processor to emanate a siren sound after said shifter has been taken out of said park or neutral position.

* * * * *